United States Patent
O'Neal

(10) Patent No.: US 7,257,704 B2
(45) Date of Patent: Aug. 14, 2007

(54) METHOD OF SELECTIVELY LOADING A PRE-BOOT EXECUTION EXTENSION DETERMINED BASED ON AN IDENTIFIER

(75) Inventor: Frank W. O'Neal, McCook Lake, SD (US)

(73) Assignee: Gateway Inc., Irvine, CA (US)

( * ) Notice: Subject to any disclaimer, the term of this patent is extended or adjusted under 35 U.S.C. 154(b) by 611 days.

(21) Appl. No.: 10/786,338

(22) Filed: Feb. 25, 2004

(65) Prior Publication Data

US 2005/0055691 A1    Mar. 10, 2005

(51) Int. Cl.
*G06F 9/00* (2006.01)
(52) U.S. Cl. .................... 713/2; 713/1; 713/100
(58) Field of Classification Search .......... 713/1, 713/2, 100
See application file for complete search history.

(56) References Cited

U.S. PATENT DOCUMENTS

| | | | |
|---|---|---|---|
| 6,317,828 B1 | 11/2001 | Nunn | |
| 6,324,644 B1 | 11/2001 | Rakavy et al. | |
| 2001/0047477 A1* | 11/2001 | Chiang | 713/170 |
| 2002/0112096 A1* | 8/2002 | Kaminsky et al. | 709/330 |
| 2003/0018751 A1* | 1/2003 | Lee et al. | 709/219 |
| 2003/0053443 A1* | 3/2003 | Owens | 370/352 |
| 2006/0005237 A1* | 1/2006 | Kobata et al. | 726/12 |

OTHER PUBLICATIONS

Preboot Execution Environment (PXE) Specification Version 2.1—Intel Corporation, Sep. 20, 1999.

* cited by examiner

*Primary Examiner*—Chun Cao
*Assistant Examiner*—Malcolm D Cribbs
(74) *Attorney, Agent, or Firm*—Ross F. Hunt, Jr.; Jeffrey Haeberlin; Stites & Harbison PLLC

(57) ABSTRACT

A PXE boot extension is requested from a PXE boot extension server from a computer. A BIOS identifier corresponding to a desired PXE boot extension is stored on the computer, and is provided to a PXE boot extension server. The PXE boot extension server determines from the BIOS identifier which of a plurality of PXE boot extensions to provide to the computer, and provides the determined PXE boot extension to the computer.

15 Claims, 2 Drawing Sheets

METHOD OF SELECTIVELY LOADING A PRE-BOOT EXECUTION EXTENSION DETERMINED BASED ON AN IDENTIFIER

FIELD OF THE INVENTION

The invention relates generally to booting a computer, and more specifically to a selecting a PXE boot extension to download from a PXE boot extension server via an identifier.

BACKGROUND OF THE INVENTION

Computers traditionally use built-in code known as a BIOS (Basic Input/Output System) to perform initial boot functions and to control certain attached devices before loading an operating system or other software. This enables a computer to receive input from a keyboard and to output data to a display, and further provides the computer with control of devices such as serial communications ports and disk drives.

When booting, a personal computer typically either executes the BIOS from ROM or flash memory, or loads the BIOS into RAM and executes the BIOS code from RAM to perform initial testing, configuration, and to initialize loading an operating system. Although operating systems are traditionally loaded from hard disks or diskette drives, BIOS extensions such as the PXE or Preboot eXecution Environment provide a computer system the ability to boot an operating system from an additional source. This technology is often used to perform functions such as booting the computer over the network connection via a network bootstrap program, or to perform other desired functions. It can also be used to load and execute PXE boot extensions or programs from other networked computers before the computer boots.

In manufacturing a computer system, it is desired that a computer be able to boot over a network using a technology such as the PXE to load boot extensions so that the computer can be configured, and to perform tasks such as loading an operating system onto the hard disk via a network connection. Doing this in an environment with multiple types of computer systems being built and configured traditionally requires that a user select the proper PXE boot extension image from a PXE boot extension server while booting a new system to ensure that the PXE boot extension specific to that computer's desired configuration is loaded from the PXE boot extension server.

It is desirable to eliminate the need for a user to manually perform the function of selecting a PXE boot extension based on the desired configuration of the booting computer.

SUMMARY OF THE INVENTION

The present invention provides in one embodiment a system and method of loading a PXE boot extension in a computer. A BIOS identifier corresponding to a desired PXE boot extension is stored on the computer, and is provided to a PXE boot extension server. The PXE boot extension server determines from the BIOS identifier which of a plurality of PXE boot extensions to provide to the computer, and provides the determined PXE boot extension to the computer.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in one embodiment a system and method of loading a PXE boot extension in a computer. A BIOS identifier corresponding to a desired PXE boot extension is stored on the computer, and is provided to a PXE boot extension server. The PXE boot extension server determines from the BIOS identifier which of a plurality of PXE boot extensions to provide to the computer, and provides the determined PXE boot extension to the computer.

Figure 1:
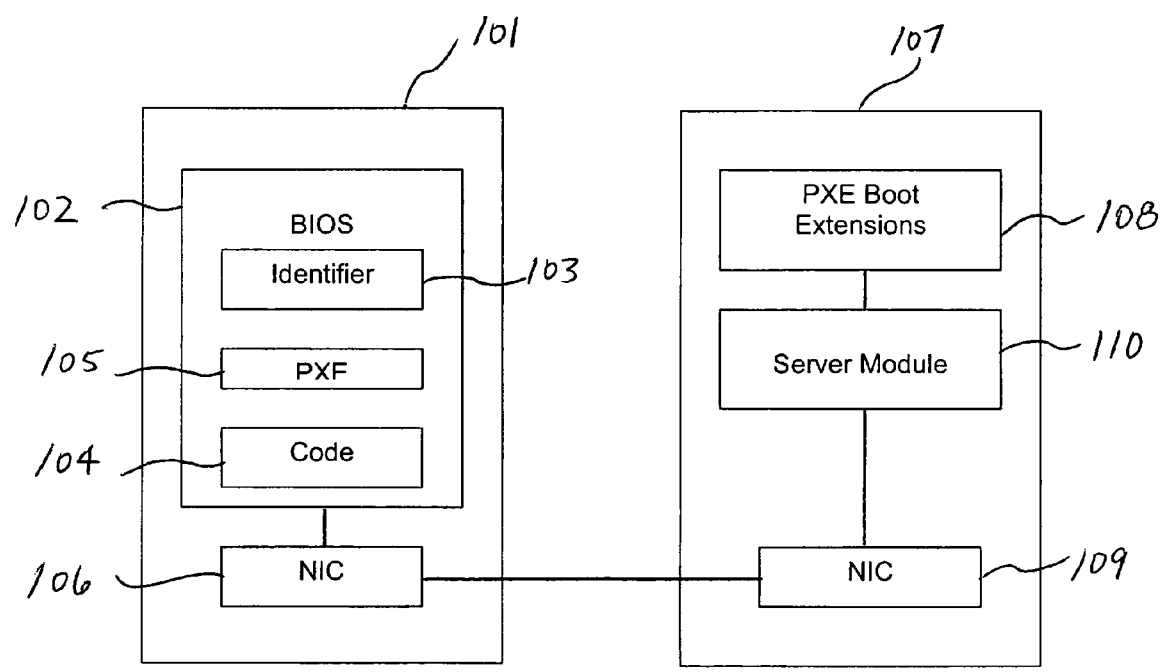
FIG. 1 shows a computer system configuration consistent with an embodiment of the present invention.

FIG. 1 shows a computer system configuration consistent with an embodiment of the present invention. A computerized system 101 contains a BIOS, or Basic Input/Output System 102, that comprises built-in software that enables the computer to perform basic functions without booting an operating system or loading software from a disk drive. A computer's BIOS typically includes code that enables use fo the keyboard, display, disk drives, and communications ports.

In this example embodiment of the invention, the BIOS also includes a BIOS identifier 103 that identifies a particular preboot execution environment extension (PXE boot extension) that is desired. The desired extension is requested by a BIOS code element 104, and upon retrieval will be executed in the preboot execution environment (PXE) 105.

A network interface card (NIC) connects the computerized system 101 to a PXE boot extension server 107 storing a number of PXE boot extensions 108 via its network card 109. When the computer system 101 requests a specific PXE boot extension from PXE boot server 107 by sending its BIOS identifier 103 along with a request over the network connection, the PXE boot server's server module 110 receives the request and provides the PXE boot extension corresponding to the BIOS identifier 105 to the requesting computer 101.

In some embodiments of the invention, the BIOS identifier 103 is a part of the BIOS loaded onto the computer during manufacture or configuration. In other embodiments, it comprises a CMOS setting that is alterable by entering a CMOS configuration setting screen on the computerized system 101. The BIOS identifier serves to identify the desired PXE boot extension, such as by uniquely identifying the type or intended use of a computer during the manufacturing process.

The PXE boot extension provided by the PXE boot extension server 107 are in some embodiments used in the manufacturing process to configure the computer system. For example, a PXE boot extension that loads an operating system image from another networked computer onto the computerized system 101's hard disk drive may be employed as a method of loading an operating system image that is preconfigured for computer 101's specific desired hardware and software specifications. The BIOS identifier may therefore cause loading PXE boot extensions that load different operating systems, different software configurations, and different driver configurations to various computer systems during their manufacture.

Figure 2:
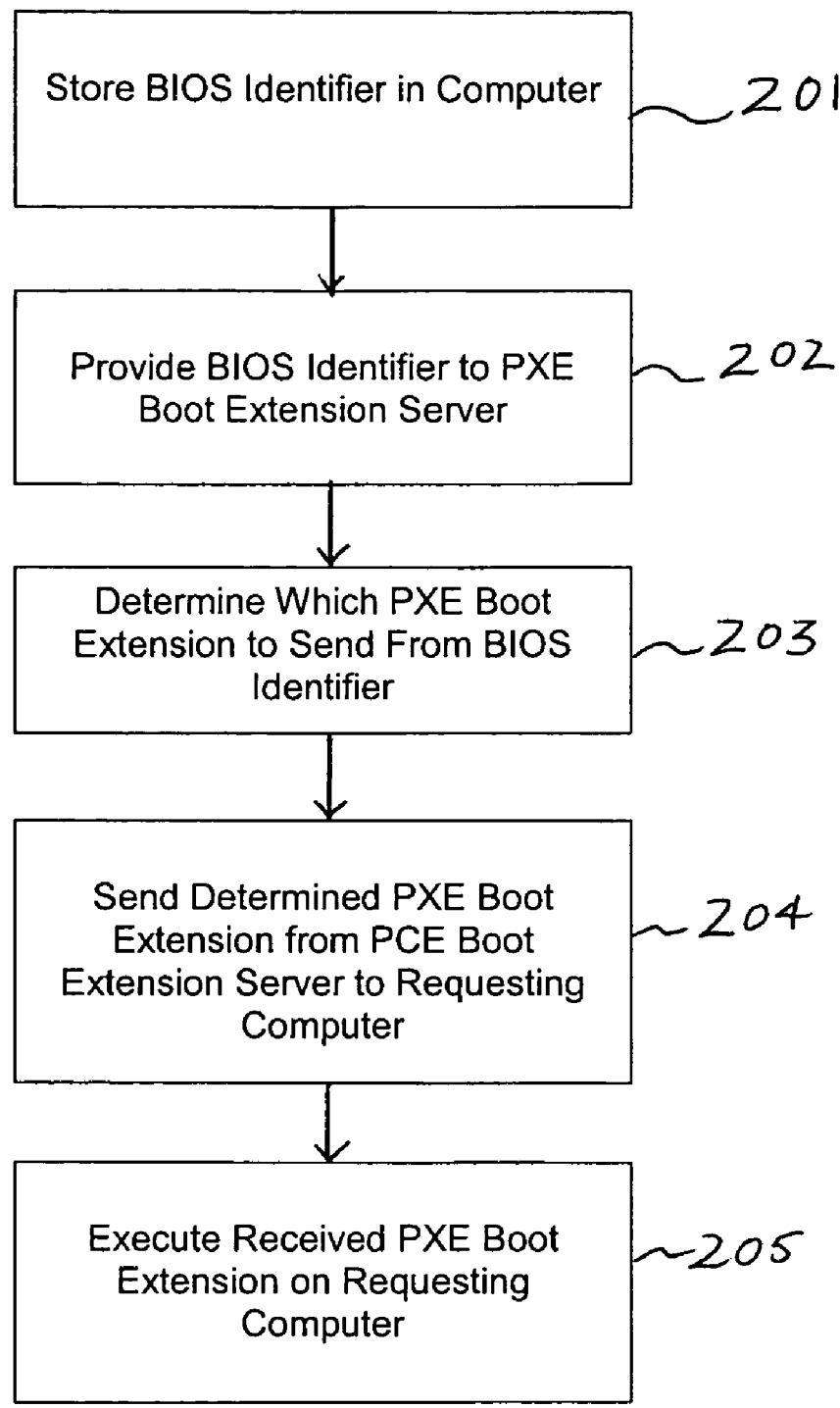
FIG. 2 shows a flowchart of a method of practicing an embodiment of the present invention.

FIG. 2 is a flowchart of a method of practicing another example embodiment of the present invention.

FIG. 2 shows a flowchart of a method of practicing an embodiment of the present invention. At 201, a BIOS identifier is stored in a computer system. The BIOS identifier is in various embodiments provided as a part of the BIOS, is a user-configurable CMOS setting, or is stored in the computer in another way. The BIOS identifier is provided to a PXE boot extension server at 202, which receives the BIOS identifier and determines which PXE boot extension corresponds to the BIOS identifier at 203. The PXE boot extension server sends the proper PXE boot extension to the requesting computer system at 204, and the requesting computer receives and loads the PXE boot extension. At 205, the requesting computer executes the received PXE boot extension in its preboot execution environment (PXE).

The PXE boot extension may in various embodiments of the invention be adapted to perform various functions, such as booting from another networked computer, loading a disk image from another networked computer to the requesting computer system, or other such functions. It is anticipated that a variety of such functions that are performed in the manufacturing process can be adapted for automated selection, loading, and execution in a PXE boot extension that is automatically identified by a BIOS identifier as is described in these example embodiments, all of which are within the scope of the present invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of loading a PXE boot extension in a computer, comprising:
    storing a BIOS identifier corresponding to a desired PXE boot extension as a part of a BIOS code of said computer;
    providing the BIOS identifier to a PXE boot extension server during execution of said BIOS code at a startup of said computer;
    determining, in the PXE boot extension server, based on the BIOS identifier which of a plurality of PXE boot extensions to provide to the computer; and
    providing from the PXE boot extension server to the computer the determined PXE boot extension.

2. The method of claim 1, wherein the determined PXE boot extension comprises a program operable to install an operating system on the computer.

3. The method of claim 1, wherein the determined PXE boot extension facilitates booting the computer from another networked computer.

4. The method of claim 1, wherein the BIOS identifier comprises a configurable CMOS setting.

5. The method of claim 1, wherein the BIOS identifier comprises a product code.

6. A computerized system, comprising:
    a BIOS identifier that identifies a desired PXE boot extension, said BIOS identifier being part of a BIOS code of said computerized system;
    a BIOS program code element operable to pass the BIOS identifier to a PXE boot extension server during execution of said BIOS code at a startup of said computer, such that said PXE boot extension server determines which of a plurality of PXE boot extensions to provide based on the BIOS identifier; and
    a PXE operable to execute a PXE boot extension received from the PXE boot extension server.

7. The computerized system of claim 6, wherein the determined PXE boot extension comprises a program operable to install an operating system on the computerized system.

8. The computerized system of claim 6, wherein the determined PXE boot extension facilitates booting the computerized system from another networked computer.

9. The computerized system of claim 6, wherein the BIOS identifier comprises a configurable CMOS setting.

10. The computerized system of claim 6, wherein the BIOS identifier comprises a product code.

11. A method of loading an operating system image that is preconfigured for a specific hardware and software specification of a computer system in a manufacturing environment wherein multiple types of computer systems are being built and configured, said method comprising:
    executing BIOS code during performance of initial boot functions of said computer system, said BIOS code containing a BIOS identifier that corresponds to a desired PXE boot extension;
    sending said BIOS identifier to a PXE boot extension server containing a plurality of different PXE boot extensions for different hardware and software specifications so that the PXE boot extension server can identify and output the desired PXE boot extension based on said BIOS identifier;
    receiving said desired PXE boot extension from said PXE boot extension server; and
    executing said PXE boot extension to load, from a networked computer onto a hard disk drive of said computer system, an operating system image that is preconfigured for said computer system.

12. The method of claim 11, wherein said step of storing said BIOS identifier includes writing said BIOS identifier to read only memory (ROM).

13. The method of claim 11, wherein said step of storing said BIOS identifier includes writing said BIOS identifier to CMOS memory that is alterable by entering a CMOS configuration setting screen on said computer system.

14. The method of claim 11, wherein said BIOS identifier includes a product code that uniquely identifies the type of the computer system.

15. The method of claim 11, wherein said BIOS identifier includes a product code that uniquely identifies the intended use of the computer system.

* * * * *